United States Patent
Gerakoulis et al.

(10) Patent No.: US 7,187,647 B1
(45) Date of Patent: Mar. 6, 2007

(54) ULTRA-WIDE BANDWIDTH SYSTEM AND METHOD FOR IN-PREMISES WIRELESS NETWORKING

(75) Inventors: Diakoumis Parissis Gerakoulis, Dover, NJ (US); Saeed S. Ghassemzadeh, Andover, NJ (US)

(73) Assignee: AT&T Corp., New York, NY (US)

( * ) Notice: Subject to any disclaimer, the term of this patent is extended or adjusted under 35 U.S.C. 154(b) by 920 days.

(21) Appl. No.: 10/055,336

(22) Filed: Jan. 23, 2002

(51) Int. Cl.
*H04J 11/00* (2006.01)

(52) U.S. Cl. ............... 370/208; 370/335; 370/342

(58) Field of Classification Search ........ 370/208, 370/209, 480, 319
See application file for complete search history.

(56) References Cited

U.S. PATENT DOCUMENTS

| | | | |
|---|---|---|---|
| 5,425,050 A * | 6/1995 | Schreiber et al. | 375/141 |
| 6,282,185 B1 * | 8/2001 | Hakkinen et al. | 370/342 |
| 6,385,457 B1 * | 5/2002 | Dam et al. | 455/456.2 |
| 6,512,737 B1 * | 1/2003 | Agee | 370/208 |
| 6,804,521 B2 * | 10/2004 | Tong et al. | 455/450 |
| 6,882,619 B1 * | 4/2005 | Gerakoulis | 370/209 |
| 6,904,283 B2 * | 6/2005 | Li et al. | 455/450 |
| 6,934,340 B1 * | 8/2005 | Dollard | 375/260 |
| 7,035,201 B2 * | 4/2006 | Fu et al. | 370/208 |

OTHER PUBLICATIONS

M. Z. Win and R. A. Scholtz, "Ultra Wide Bandwidth Time Hopping Spread-Spectrum Impulse Radio for Wireless Multiple Access Communications," *IEEE Trans. Commun.*, vol. 48, No. 4, Apr. 2000, pp. 679-691.

F. Ramirez-Mireles, "Performance of Ultrawideband SSMA Using Time Hopping and M-ary PPM," *IEEE J. Selected Areas in Commun.*, vol. 19, No. 6, Jun. 2001, pp. 1186-1196.

D. Cassioli, M. Z. Win and A. F. Molisch, "A Statistical Model for the UWB Indoor Channel," *IEEE Vehic. Techn. Conf.*, May 2001, Rhodes, Greece.

* cited by examiner

Primary Examiner—Chau Nguyen
Assistant Examiner—Christopher Grey
(74) Attorney, Agent, or Firm—Banner & Witcoff, Ltd.

(57) ABSTRACT

An IS-OFDM system for ultra-wideband (UWB) wireless communications that suppresses narrow-band interference, comprising an in-premises base station (IBS) is described. The IBS further comprises an IS-OFDM transceiver for communicating with a plurality of in-premises terminals (ITs) without creating interference outside an in-premises perimeter. Further, a method for operating an IS-OFDM system for ultra-wideband (UWB) wireless communication that suppresses narrow-band interference and provides local area networking services, in-premises distribution of broadcast cable channels and in-premises wireless access and routing to external networks is described, without creating interference outside an in-premises perimeter.

4 Claims, 8 Drawing Sheets

N = 4096, M = 16, 32, 64: L = 256, 128, 64: AND N = LM.

ULTRA-WIDE BANDWIDTH SYSTEM AND METHOD FOR IN-PREMISES WIRELESS NETWORKING

FIELD OF THE INVENTION

The present invention relates generally to the field of telecommunications and particularly, to an ultra-wide bandwidth wireless network for in-premises wireless networking and wireless distribution of cable TV channels. Further, the physical link is based on interference suppressing (IS) orthogonal frequency division modulation (OFDM) (IS-OFDM) in order to suppress narrow-band interference.

BACKGROUND OF THE INVENTION

A wireless channel is said to be ultra-wide if its −20 dB bandwidth is wider than one quarter of its carrier (center) frequency. Ultra-wide bandwidth (UWB) radio technology has been used in the past for radar and remote sensing applications. Recently, however, the use of ultra-wide bandwidth technology has been proposed for use in wireless communications. An UWB communication channel has the advantage of providing single, integrated, homogeneous and seamless access for a wide variety of wireless services. The UWB radio system has its design based on a method similar to the one used in radar systems, which is the transmission of carrierless ultra-short (tenths of nsec) pulses or impulses. These impulses are transmitted at random or pseudo-random time intervals, in order to minimize other user interference in multiple access channels. This method is known as time-hopping impulse-radio (TH-IR).

The present invention uses ultra-wide bandwidth technology for wireless in-premises networking. In-home communications and networking are used as an example of in-premises communications and networking. An UWB wireless in-home network (WIN) will distribute cable TV channels and provide wireless links for Internet access and local area networking in every room of the home. The required bit rate for such a network is estimated to be 500 Mb/s or more. In order to meet such a bit rate requirement the proposed UWB system has to have an alternative design. Unlike the TH-IR, the UWB link presented herein, has been designed in the frequency domain with a carrier in the frequency region of 6 GHz. Also, the present invention suppresses the narrow-band interference, which is often present in UWB channels.

SUMMARY OF THE INVENTION

The present invention is an ultra-wide bandwidth (UWB) wireless network for in-home wireless networking and wireless distribution of cable TV channels. Network services, the media access control, channels measurements, and the physical link transmitter and receiver design are described herein. The physical link is based on an IS-OFDM in which the total number of frequency bins (sub-carriers) of the UWB channel is divided into groups. Every frequency bin in a group will carry all transmitted symbols for that group, which are distinguished and separated from each other by orthogonal Hadamard sequences. The present invention suppresses narrow band interference, which is often present in UWB channels. The IS-OFDM link is also expected to satisfy the high bit rate needs and meet the required quality of service with a minimum transmit power so that it does not cause interference beyond the perimeter of the home.

The network of the present invention provides wireless services within residential homes. These services include: (a) Local area networking, (b) Wireless in-home distribution of broadcast cable channels and (c) In-home wireless access and routing to external (outdoor) networks.

The local area wireless networking services include broadcast video and in-home wireless data/voice networking. The local broadcast video service allows wireless video transmission from one VCR or DVD to one or more TV receivers. Also, the local in-home wireless network may deliver interactive data traffic between home PCs, provide wireless networking for control devices (i.e. thermostats, switches etc.) and intra-home voice communications, such as intercoms.

Wireless in-home distribution of broadcast cable TV channels may be distributed wirelessly to one or more TVs, thus avoiding wiring each room in the home with a cable TV jack. In this case, it is assumed that there is a need for simultaneously broadcasting within the home up to four TV channels.

The wireless in-home network (WIN) can also offer several in-home wireless links for voice and internet access, which avoids wiring to fixed locations. This, in turn, allows mobility to the subscriber within the home.

It is, therefore, an object of the present invention to provide wireless services within residential homes including local area networking, wireless in-home distribution of broadcast cable channel signals and in-home wireless access and routing to external (outdoor) networks.

BRIEF DESCRIPTION OF THE DRAWINGS

The invention is best described with reference to the detailed description and the following figure, where.

DETAILED DESCRIPTION OF THE PREFERRED EMBODIMENTS

The method of delivering the wireless traffic for the above services should not be specific to the type of traffic or system originating it. For this reason, the received analog signal from an external source network or device, will be sampled and pulse code modulated (PCM) in order to be transmitted over the WIN. In particular, a cable TV channel having a bandwidth of 6 MHz will be sampled at a rate of 12 Mb/s. Then, after using a 16-level PCM ($2^4$=16) this rate becomes 48 Mb/s (12 Mb/s×4). Assuming a forward error correction of rate ½, the resulting transmission rate for each TV channel will be 96 Mb/s and the required rate of having four simultaneous TV-channels transmissions is 384 Mb/s. Now, taking into account the other services described above, it is estimated that the total bit rate over the WIN needs to be 500 Mb/s or more.

The above traffic volume will be carried by the physical link, which will occupy a bandwidth of 1.25 GHz with carrier frequency in the region of 6 GHz. The physical link design, is based on a type of orthogonal frequency division multiplexing (OFDM) called interference suppressing OFDM (IS-OFDM). The IS-OFDM provides N=4096 sub-carriers or frequency bins over the entire bandwidth. These frequency bins are divided into L groups with M bins per group (N=LM), where L=64, 128, 256 or 512 and correspondingly M=64, 32, 16 or 8. The IS-OFDM then allows each transmitting user to occupy some or all L groups of bins. In the case where a user does not transmit over all groups, a second user may transmit over those groups in which the first user does not. Given the fact that transmission over different bins from non-colocated (non-synchronous) users, destroys orthogonality the use of such scheme with an ordinary OFDM is not be feasible. IS-OFDM however, allows simultaneous transmissions of different users over different groups, by providing the capability of recovering the interfering symbols in adjacent groups.

Figure 1:
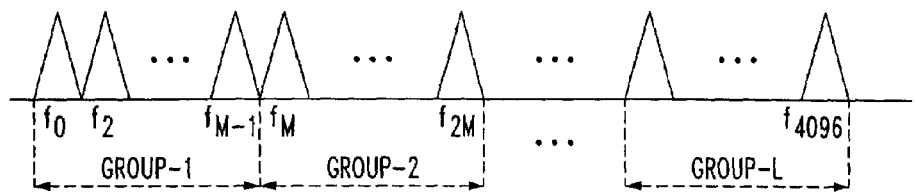
FIG. 1 shows the configuration of the physical link IS-OFDM sub-carriers in the UWB channel.

FIG. 1 shows the configuration of the physical link IS-OFDM sub-carriers in the UWB channel. Specifically, the 4096 bins are separated into L groups of M bins per group for a total of 4096 bins. That is, if there are 256 groups then there would be 16 bins per group. If there are 128 groups then there would be 32 bins per group. Each sub-carrier center frequency is indicated by $f_i$, where i=1, . . . , 4096. Each subcarrier 105 is indicated by a triangle which peaks at the subcarrier center frequency.

The WIN is comprised of one in-home base station (IBS) and a number of in-home terminals (IT). The IBS receives wired traffic from an external network and broadcasts it to the ITs within the home or receives the wireless transmissions from the ITs and routes their traffic to an external network. The ITs may also transmit or receive internal in-home traffic directly to or from other ITs.

Transmissions may take place simultaneously. The media access control is based on a point coordinated function which is provided by the IBS. More specifically, there is an assigned group of bins, called the control-group, for carrying control messages to and/or from the IBS. Each IT, before it transmits data, sends a request via the control-group, to the IBS. The IBS keeps a record of the on-going transmissions and the available bandwidth at any time. Based on the available and the requested bandwidth the IBS responds to the IT with a message granting or blocking the request. If a request is granted, then the response message also indicates the groups of bins in which the IT may transmit its data.

The design of the physical link is based on the method of interference suppressing orthogonal frequency division multiplexing (IS-OFDM) present in U.S. application Ser. No. 09/969,795 by Diakoumis Gerakoulis entitled "An Interference Suppressing OFDM System for Wireless Communications" filed Oct. 4, 2001, and U.S. application Ser. No. 09/969,868 by Diakoumis Gerakoulis entitled "An Interference Suppressing OFDM Method for Wireless Communications" filed Oct. 4, 2001, incorporated in their entirety herein by reference and which has then been adjusted for use in UWB channels.

Before describing the IS-OFDM UWB wireless in-home network design, some indoor measurements of the UWB channel are presented. The channel measurements shown in FIGS. 2(a), 2(b) 3(a) and 3(b) were performed in many residential homes in the northern and central New Jersey area, using the technique of frequency swept channel sounding. The channel bandwidth and center frequency were 1.25 GHz and 5.25 GHz respectively.

Figure 2A:
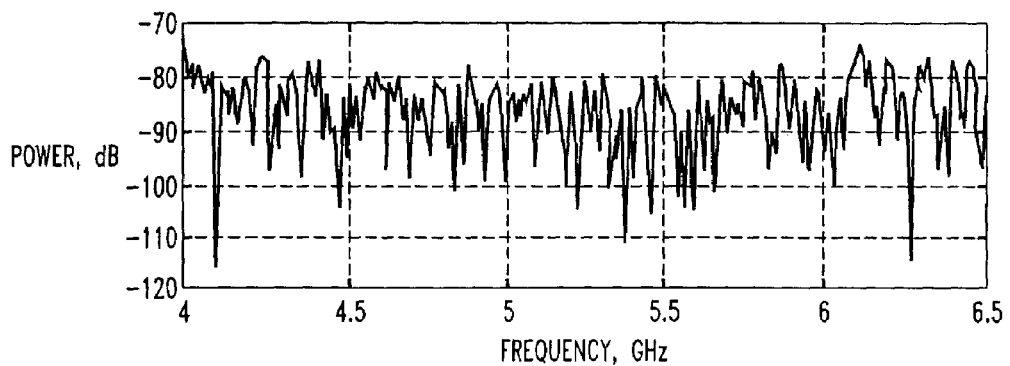
FIG. 2(a) illustrates a typical UWB non-line-of-sight (NLOS) frequency response.
Figure 2B:
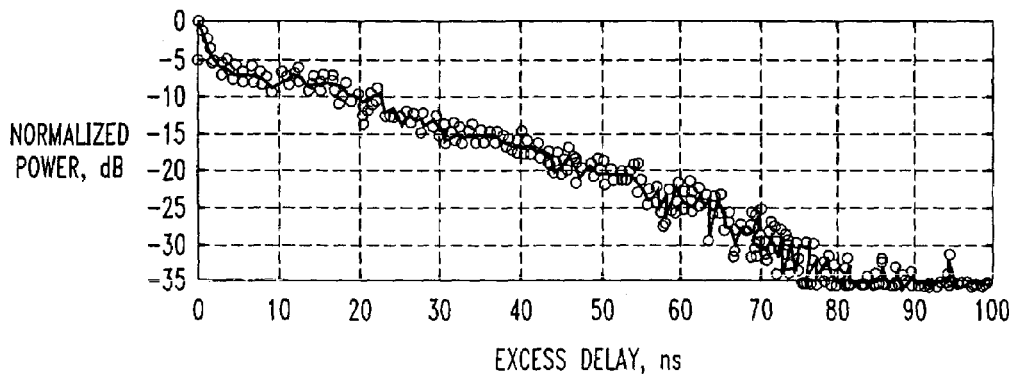
FIG. 2(b) illustrates a typical UWB NLOS impulse response.
Figure 3A:
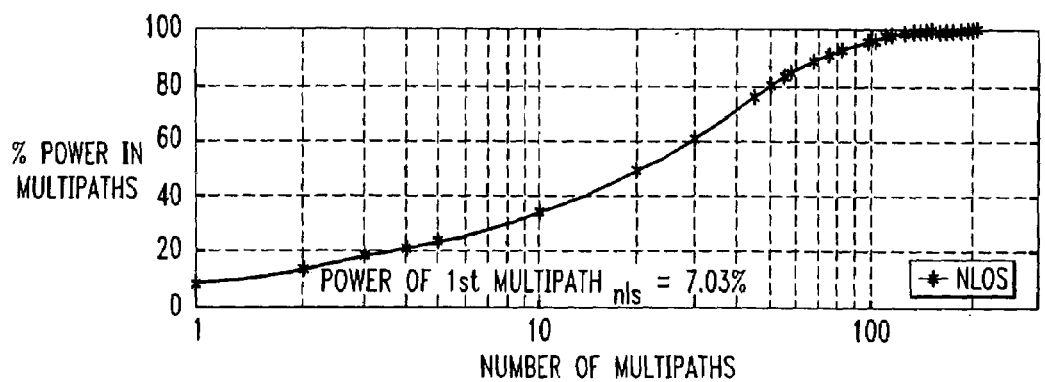
FIG. 3(a) shows the percentage of energy captured from each path.
Figure 3B:
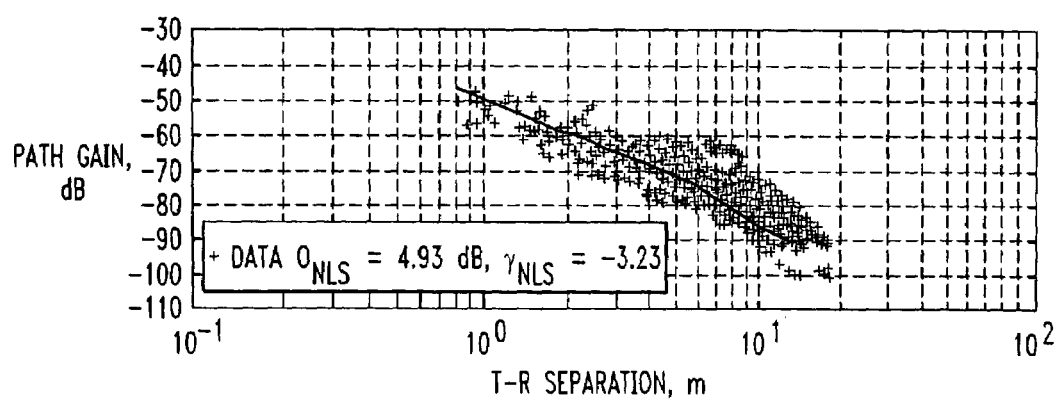
FIG. 3(b) shows the path loss as a function of distance.

FIG. 2(a) illustrates a typical UWB non-line-of-sight (NLOS) frequency response and FIG. 2(b) shows a typical NLOS impulse response of the UWB channel. Due to nature of the measurements the channel frequency response did not exhibit significant variability in time and can be assumed time-invariant. The impulse response in FIG. 2(b) indicates that the mean excess delay is about 25 nsec while the RMS delay spread is 11 nsec. FIG. 3(a) shows the percentage of signal energy in each path. In almost all homes the first returns were either blocked or scattered. By analyzing the time domain data it was found that on the average the first return only carried 7% of the total energy. Also, as shown, in order to collect 70% of the signal energy would require that about 40 paths were received. FIG. 3 (b) shows a scatter plot of measured path gains as a function of distance for all non-line-of-sight locations. The slope of the line is −3.2 corresponding to 32 dB loss/decade. The standard deviation about this line (median path loss) corresponds to shadow fading and is about 5.

In addition to the above propagation characteristics, the channel in its ultra-wide bandwidth, will have significant interference from many narrow-band transmissions, such as cell phones, radio stations, etc. Also, the system design of the present invention must obey Federal Communication Commission (FCC) rules on UWB emission limits so that the in-home transmissions does not cause interference outside the perimeter of the home.

Figure 4:
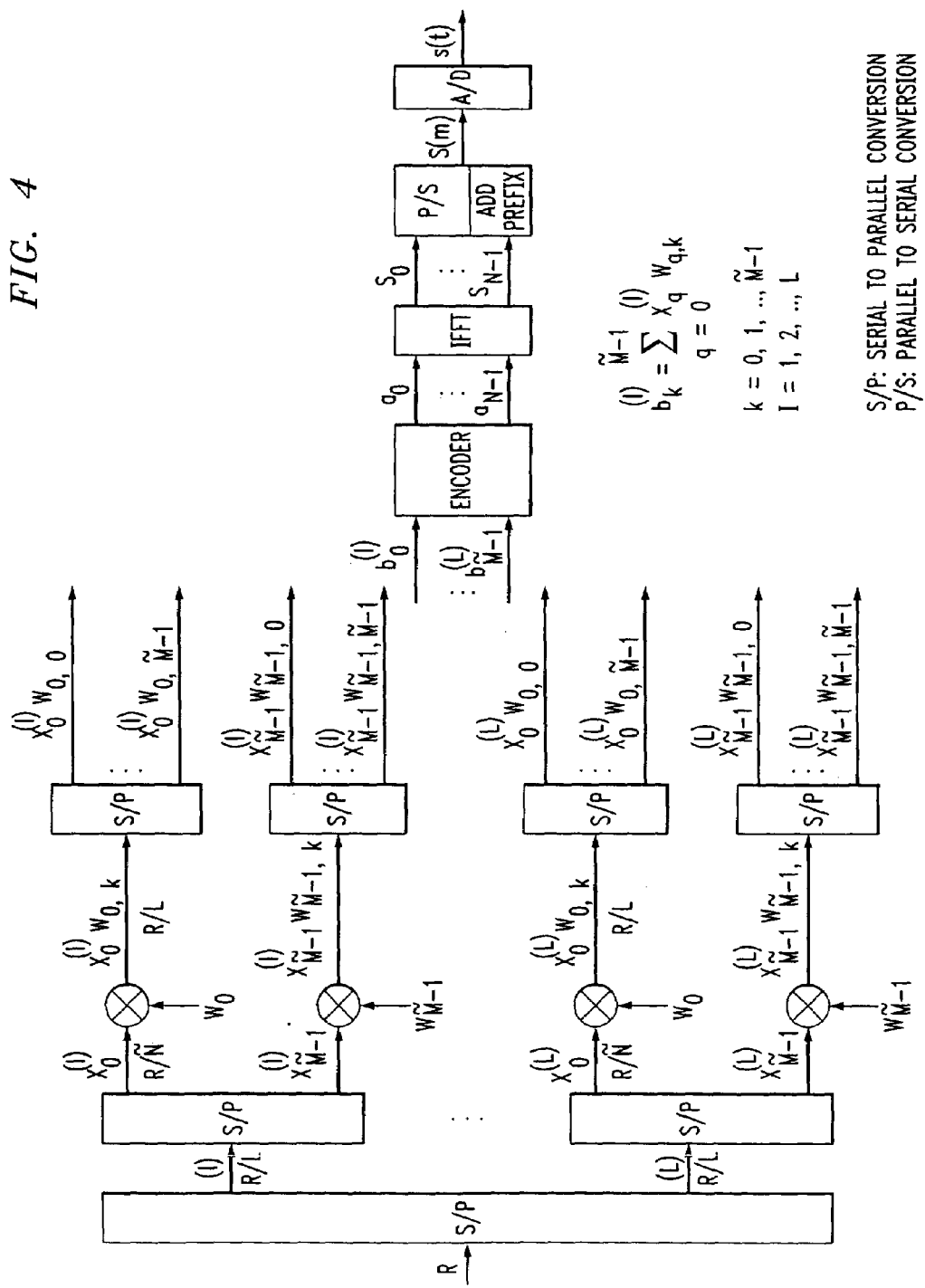
FIG. 4 is an IS-OFDM transmitter with N=LM.

The IS-OFDM transmitter design is shown in FIG. 4. The IS-OFDM transmitter includes a serial-to-parallel (S/P) converter 405, which accepts an input data stream and operates on the input data stream to produce a plurality of parallel data streams. A first plurality of S/P converters 410 is coupled to the S/P converter. Each of said first plurality of S/P converters accepts one of the parallel data streams and produces a plurality of parallel data sub-streams. A plurality of spreaders 415, each spreader of the plurality of spreaders is coupled to one of the first plurality of S/P converters 410 and operates on one of the plurality of parallel data sub-streams spreading one of the plurality of parallel data sub-streams by an orthogonal binary code sequence resulting in a plurality of parallel spread data sub-streams separated from each other by orthogonal codes. A second plurality of S/P converters 420 accepts one of the plurality of parallel spread data sub-streams and produces a plurality of parallel data signals. An encoder 425 for encoding the plurality of parallel data signals produces a plurality of encoded data signals. An IDFT 430 is coupled to the encoder and accepts the plurality of encoded data signals and produces a plurality of IDFT outputs. A parallel-to-serial (P/S) converter 435 is coupled to the IDFT and accepts the plurality of IDFT outputs and produces an intermediate IS-OFDM data signal, which comprises a plurality of frames. The P/S converter further adds a cyclic prefix to each frame of the intermediate IS-OFDM data signal to produce an IS-OFDM data signal. A digital-to-analog (D/A) converter 440 is coupled to the P/S converter and accepts the IS-OFDM data signal and produces an IS-OFDM transmit signal.

As shown, an input data stream of rate R bits/sec, enters a serial-to-parallel (S/P) converter which provides L parallel data streams. Each parallel stream of rate R/L enters again a second S/P converter which provides $\tilde{M}$ parallel substreams each with rate $R/\tilde{N}$, where $\tilde{N}=L\tilde{M}$. At the output of the S/P converter, a data signal $x_q$ (T sec long), of a parallel stream q is spread by an orthogonal binary Hadamard code sequence $$w_q = [w_{q,0}, w_{q,2}, \ldots, w_{q,\tilde{M}-1}], \text{ for } q=0, \ldots, \tilde{M}-1,$$

(the entire sequence of length T has to "overlay" a single data symbol also of length T). After the spreading operation the signal rate is R/L bits/sec. Assuming that $x_q^{(l)}$ represents a complex-valued signaling point in a QAM constellation, i.e., $x_q^{(l)} = \alpha_q^{(l)} + j\beta_q^{(l)}$, the spread signal is given by, $$x_q^{(l)} w_{q,k} = \alpha_q^{(l)} w_q^{(l)} + j\beta_q^{(l)} w_{q,k} \quad (1)$$

where $k=0, \ldots, \tilde{M}-1$ and $l=1, \ldots L$. Define $$b_q^{(l)} = \sum_{q=0}^{M-1} x_q^{(l)} w_{q,k} \quad (2)$$

where $k=0, \ldots, \tilde{M}-1$ and $l=1, \ldots, L$. For any pair (k, l) define, $$a_i = \begin{cases} \Re\{b_0^{(1)}\} = \sum_{q=0}^{M-1} \alpha_q^{(1)} w_{q,o} & \text{for } i=0 \\ b_k^{(l)} & \text{for } i=kL+l-1; \text{ and for every } (k,l) \neq (0,1) \\ \Im\{b_0^{(1)}\} = \sum_{q=0}^{M-1} \beta_q^{(1)} w_{q,0} & \text{for } i=N \\ \{b_k^{(l)}\}* & \text{for } i=2ML-(kL+l-1) \text{ and for every } (k,l) \neq (0,1) \end{cases}$$

In the above equation it is assumed that $\tilde{N}=L\tilde{M}$ and $N=2\tilde{N}$. This process takes place in the encoder which provides N parallel points $a_i$ to the input of the IDFT, the output of which is given by, $$s_n = \frac{1}{\sqrt{N}} \sum_{i=0}^{N-1} a_i e^{j2\pi(in/N)} \text{ for } n=0, 1, \ldots, N-1 \quad (4)$$

Now, use the matrix $D_M$ shown below for representing the distribution of the transmitted symbols over the frequency bins of the UWB channel.

$$D_M = \begin{bmatrix} x_0^{(1)} \ldots x_0^{(1)} | \ldots | x_0^{(L)} \ldots x_0^{(L)} \\ x_1^{(1)} \ldots x_1^{(1)} | \ldots | x_1^{(L)} \ldots x_1^{(L)} \\ \ldots | \ldots | \ldots \\ x_{M-1}^{(1)} \ldots x_{M-1}^{(1)} | \ldots | x_{M-1}^{(L)} \ldots x_{M-1}^{(L)} \end{bmatrix} \begin{matrix} \leftarrow w_0 \\ \leftarrow w_1 \\ \\ \leftarrow w_{M-1} \end{matrix}$$

$$\uparrow \quad \uparrow \quad \uparrow \quad \uparrow$$
$$f_0 \quad f_{\tilde{M}-1} \quad f_{\tilde{N}-\tilde{M}-1} \quad f_{\tilde{N}-1}$$

As shown, there are L sets or groups of bins with $\tilde{M}$ frequency bins per group, so that $\tilde{N}=L\tilde{M}$. Then, every frequency bin in a set l contains all data points $x_q^{(l)}$ for $q=0, \ldots, \tilde{M}-1$. This means that the transmitted power of each symbol is distributed over the $\tilde{M}$ frequency bins of that set. Therefore, if one or more bins are corrupted by narrow-band interference, the affected symbols can be recovered from the remaining bins.

If it is assumed L=1, then the resulting system having N=M is the basic IS-OFDM. In addition, if the spreading orthogonal Hadamard matrix $W=[w_1, w_2, \ldots, w_{\tilde{N}}]^T$ is replaced with an identity matrix W=I, the resulting system is the ordinary OFDM. Also, if we take $\tilde{M}=1$ and $\tilde{N}=L$ the resulting system is again the ordinary OFDM. The parameter value of $\tilde{N}$ for the UWB channel of about 1.25 GHz is chosen to be N=4096 frequency-bins. These bins are divided into L=64, 128, 256 or 512 sets or groups, with corresponding values of $\tilde{M}$=64, 32, 16 and 8 bins per group as shown in FIG. 1.

Figure 5:
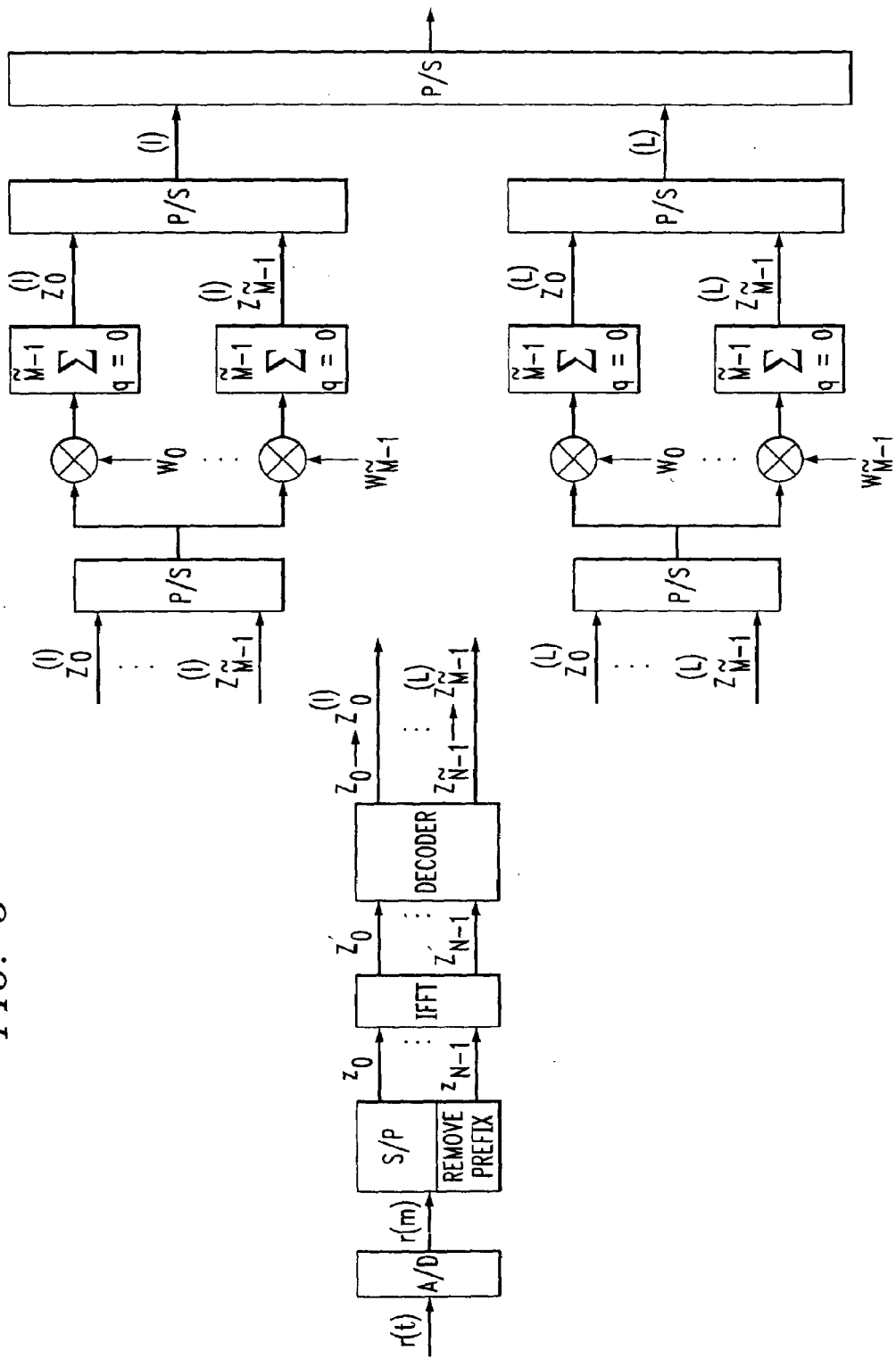
FIG. 5 is an IS-OFDM receiver with N=LM.

The receiver design is shown in FIG. 5. The IS-OFDM receiver includes an analog-to-digital (A/D) converter 505, which accepts a received analog signal and operates on the received analog signal to produce a digital received signal. A serial-to-parallel (S/P) converter 510 is coupled to the A/D converter and accepts the digital received signal, which comprises a plurality of frames. The S/P converter operates on the digital received signal to produce a plurality of parallel received data points and further operates on the digital received signal to remove a cyclic prefix from each frame. A DFT 515 is coupled to the S/P converter and accepts the plurality of parallel received data points and operates on the plurality of parallel received data points to produce complex data signal points. A decoder-demapper 520 is coupled to the DFT and accepts the complex data signal points and operates on the complex data signal points to produce a plurality of parallel data points. A first plurality of parallel-to-serial (P/S) converters 525 is coupled to the decoder-demapper. The first plurality of P/S converters accepts the plurality of parallel data points, and operates on the plurality of parallel data points to produce a serial data stream. A plurality of despreaders 530 is coupled to one of the plurality of P/S converters and accepts said serial data stream and operates on the serial data stream in parallel with a plurality of code sequences to produce despread data signals. A plurality of accumulators 535, with each accumulator coupled to one of the plurality of despreaders. The plurality of accumulators accepts the despread data signals and operate on the despread data signals to produce accumulated data streams. A second plurality of P/S converters 540 is coupled to the plurality of accumulators. Each of the plurality of P/S converters accepts the accumulated data streams and operates on the accumulated data streams to produce an intermediate recovered data stream. A P/S converter 545 is coupled to the second plurality of P/S converters and accepts the intermediate recovered data streams and operates on the intermediate recovered data streams to produce a recovered data stream. AN IS-OFDM transmitter and an IS-OFDM receiver may be combined and referred to as an IS-OFDM transceiver.

As shown, the received signal enters an IS-OFDM receiver, which provides N parallel outputs $\tilde{Z}_k^{(l)}$.

$$Z_k^{(l)} = b_k^{(l)} * H_k^{(l)} + I_k^{(l)} + J_k^{(l)} + n_k^{(l)} \quad (5)$$

where $H_k^{(l)}$ is the transfer function of the channel at frequency bin k in group l, $I_k^{(l)}$ is the intersymbol and interchannel interference, J is the narrow-band interference and $n_k^{(l)}$ is the AWGN. Also, $$b_k^{(l)} = \sum_{q=0}^{M-1} x_q^{(l)} w_{q,k}$$

for k=0, 1, ..., M̃−1 and l=1, ..., L. As shown in FIG. 5, in each group l, the signal $Z_k^{(l)}$ enters a parallel-to-serial (P/S) converter the outputs of which are despread by the orthogonal sequences for recovering the data. The output of the despreader 0 of group l=1 is given by, $$Z_0^{(1)} = \sum_{k=0}^{M-1} Z_k^{(1)} w_{0,k} \quad (6)$$

$$= \sum_{k=0}^{M-1} [b_k^{(1)} H_k^{(1)} + I_k^{(1)} + J_k^{(1)} + n_k^{(1)}] w_{0,k}$$

The useful signal (represented by the first term above) provides the data $x_0^{(l)}$ at the output of the despreader 0, as shown below, $$\sum_{k=0}^{M-1} b_k^{(1)} H_k^{(1)} w_{0,k} = \quad (7)$$

$$H^{(1)} \sum_{k=0}^{M-1} \left[ \sum_{q=0}^{M-1} x_q^{(1)} w_{q,k} \right] w_{0,k} = H^{(1)} \sum_{q=0}^{M-1} x_q^{(1)} \sum_{k=0}^{M-1} w_{q,k} w_{0,k}$$

$$\begin{array}{ll} H^{(1)} M x_0^{(1)} & \text{for } q = 0 \\ 0 & \text{for } q \neq 0 \end{array}$$

The above derivation is based on the assumption that the channel is frequency-flat within each frequency bin group l; That is, $H_k^{(l)} = H^{(l)}$ is constant for k=0, 1, 2, ..., M−1. In order to satisfy this condition, a narrow group-width (narrower than the channel's coherent bandwidth) is chosen, or each $\hat{H}_k^{(l)}$ is compensated, (the compensation is based on the channel estimation $H_k^{(l)}$ of each bin).

Given the value of Ñ=4096, the choices of the system parameters L and M̃ are such that the group-width is narrower than the coherence bandwidth of the channel and the group-width is wide enough to have the capability to suppress narrow-band interference, (since interference can only be suppressed if it has narrower bandwidth than the width of each group of bins). Therefore, given that each bin is about 300 kHz, the UWB channel has delay spread less than 25 nsec, and assuming that the bandwidth of each interferer is less than 600 kHz the best estimated values are M̃=8, 16 or 32 which corresponds to L=512, 256 or 128. That is, to have each group-width equal to 2.5, 5 or 10 MHz. Then, each of the L parallel receptions will maintain a satisfactory quality.

Also, considering the requirement that the in-home transmission power should be low enough, so that it does not cause interference outside the perimeter of the home, the link's BER performance can be enhanced by using an appropriate FEC channel encoder.

An ultra-wide bandwidth wireless in-home network has been described. This includes network services, media access control, channels measurements and the transmitter and receiver designs. The UWB IS-OFDM wireless in-home network of the present invention broadcasts cable TV channels within the home and provides wireless networking and access to external networks at a total estimated bit rate 500 Mb/s. The physical link design of the present invention is based on an IS-OFDM in which the total number of frequency bins in the UWB channel is divided into groups. All bins in each group will carry all transmitted symbols for that group, which are distinguished and separated from each other by orthogonal Hadamard sequences. Such a system then suppresses narrow-band interference and avoid the effects of frequency selective fading by choosing the group-width to be wider than the interference bandwidth and narrower than the UWB channel's coherent bandwidth. The IS-OFDM link is also expected to satisfy the bit rate needs and meet the required quality of service with a minimum transmit power so that it does not cause interference beyond the perimeter of the home. Finally, the proposed system provides multiple access capability by allowing independent users to transmit asynchronously in different groups of bins.

Simulations have been performed for a UWB channel with bandwidth about 1.25 GHz with the following results. The value of the parameter Ñ is chosen to be Ñ=4096 frequency bins, which corresponds to a bin-width of about Δf=305 kHz. The results of the system performance experiments are given below for two different channel types: (a) a Narrow-Band Interference and average white Gaussian noise (AWGN) channel, and (b) an Inter-Symbol and Inter-Channel Interference channel based on indoor propagation measurements. The bit error rate (BER) performance results are presented for different values of the parameters M̃ and L(M̃=Ñ/L) and with QPSK modulation in all sub-carrier frequencies.

For the narrow-band interference channel, the uncoded bit error probability due to a narrow band interference (NBI) and AWGN the performance results obtained by computer simulation are presented below. The parameter M̃ is set to be M̃=64, so that L=4096/64=64. This corresponds to a width of the basic IS-OFDM band, B≈20 MHz.

The NBI is modeled as a Gaussian process with constant one-sided spectral density $\sigma_i^{(NB)}$ and total bandwidth $\Sigma_i W_i^{(nb)} \approx 10$ MHz. The process is the output of a 20-tap linear bandpass frequency impulse response (FIR) filter, characterized by a stop-band attenuation equal to −30 dB, driven at the input by a Gaussian sequence.

The uncoded BER of the UWB system is equal to the average BER, of the L basic IS-OFDM bands. This is true because all L bands are orthogonal to each other in an AWGN channel and only the basic IS-OFDM has NBI rejection capability. Hence, the performance results given below are those of a basic IS-OFDM system with bandwidth B≈20 MHz.

Figure 6:
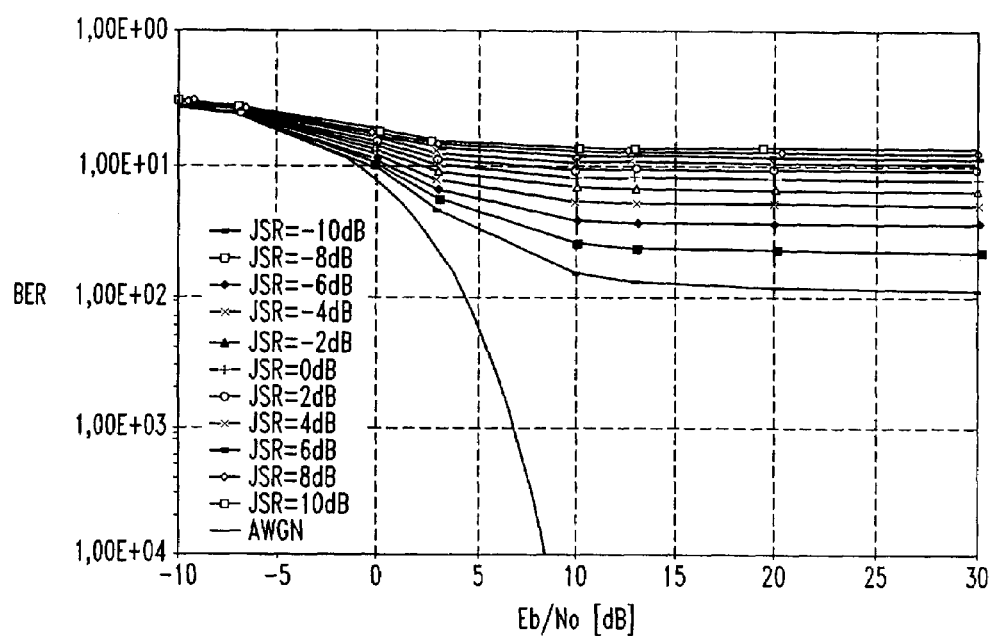
FIG. 6 shows the average bit error rate probability (BER) of the ordinary OFDM system versus the $E_b/N_0$ [dB] ($N_0$ is the power spectral density of the AWGN) and the JSR as a parameter with the values considered above.
Figure 7:
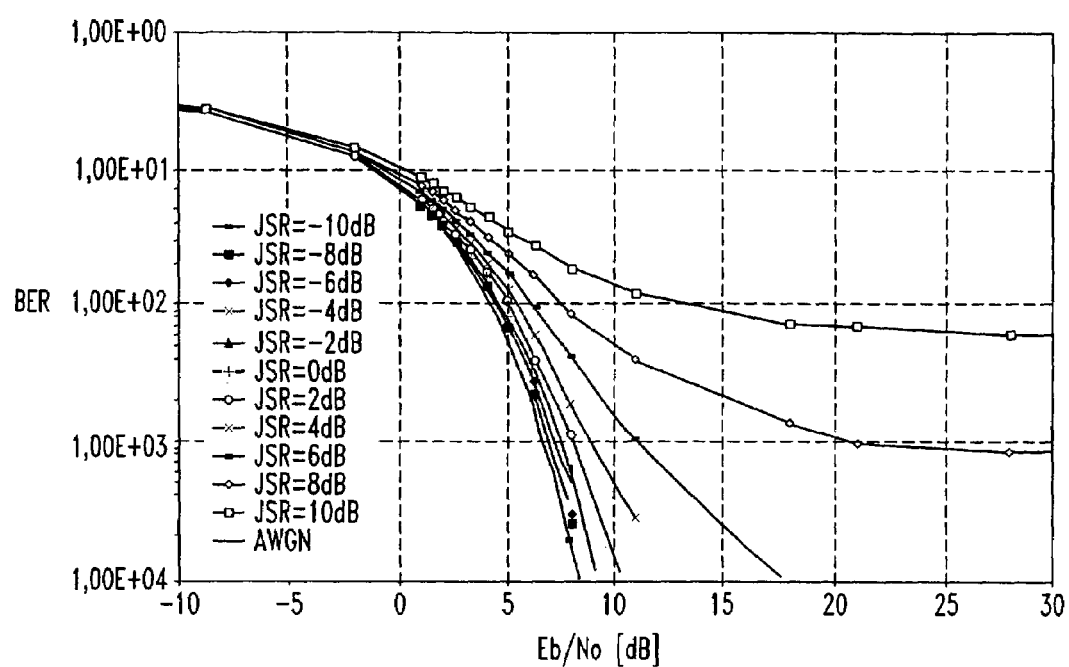
FIG. 7 shows the average bit error rate probability (BER) of the basic IS-OFDM system versus the Eb/N0 [dB] with the narrowband interference power to signal ratio JSR as a parameter.

The uncoded bit error probability in a basic IS-OFDM band has been evaluated for power of interference to signal ratios JSR=−10, −8, ..., +8, +10 dBs. JSR, is defined as the ratio $JSR=P_I/P_S$, where $P_I$ is the average interference power and $P_S$ is the average transmitted signal power. FIGS. 6 and 7 show the performance results for the ordinary OFDM and basic IS-OFDM systems respectively. The ordinary OFDM has been generated from the basic IS-OFDM by taking an identity matrix instead of a Hadamard matrix, so that the two systems are equivalent.

FIG. 6 shows the average bit error rate probability (BER) of the ordinary OFDM system versus the $E_b/N_0$ [dB] ($N_0$ is the power spectral density of the AWGN) and the JSR as a parameter with the values considered above. The performance curve for an AWGN channel is taken as a benchmark. As is observed, there is a significant BER floor when $E_b/N_0 > 10$ dB. For a target BER equal to $2 \times 10^{-2}$, a shifting of 5 dB is visible for lower values of JSR, e.g. JSR=−10 dB. This penalty grows drastically for any higher value of interference power, and it becomes unbearable. In such a case, an FEC coding would not significantly improve the system performance.

FIG. 7 shows the average bit error rate probability (BER) of the basic IS-OFDM system versus the $E_b/N_0$ [dB] with the narrowband interference power to signal ratio JSR as a parameter. Performance results indicate that the degradation induced by narrowband interference (NBI) is less than 2 dB for JSR ≤ 0 dB and for BER=$10^{-3}$, instead of infinity in the case of ordinary OFDM. The BER for IS-OFDM can be less than $2 \times 10^{-2}$, even if JSR=10 dB.

Hence, as shown by the above simulation results, the IS-OFDM system has a significant $E_b/N_0$ gain over the ordinary OFDM in a NBI with AWGN channel, which tends to become infinite when the error floor of the ordinary OFDM is above a target BER.

Simulation results of the UWB IS-OFDM system for an indoor UWB multipath channel are now presented. The results provide the uncoded BER with the following system parameter values:

parameter $\tilde{N}$=4096 and $\tilde{M}$=32, 64, 128 and 256 corresponding values of L are, L=128, 64, 32 and 16. (since $\tilde{N}=LM$).

Given the UWB channel bandwidth $B_U$=1.25 GHz, the widths of each basic IS-OFDM band are B≈10, 20, 40 and 80 MHz corresponding to the values of $\tilde{M}$=32, 64, 128 and 256. Also, the system data modulation is QPSK in all frequency bins and perfect channel estimation at the receiver is assumed.

The channel delay spread has been taken τ=58 nsec and the coherence bandwidth is $(\Delta f)_c \cong 17$ MHz. This value of τ occurs at a threshold of 20 dB below maximum return for which 99.4% of total signal power is collected. The signal amplitude is considered to have a Ricean distribution model with factor K=10 dB.

The encoded BER of the UWB IS-OFDM system has been calculated by taking the average BER of the L basic IS-OFDM bands and considering the additional ICI/ISI interference contributed by the adjacent (upper and lower) bands. Moreover the ICI/ISI interference has been set equal to $5 \times 10^{-5}$.

Figure 8:
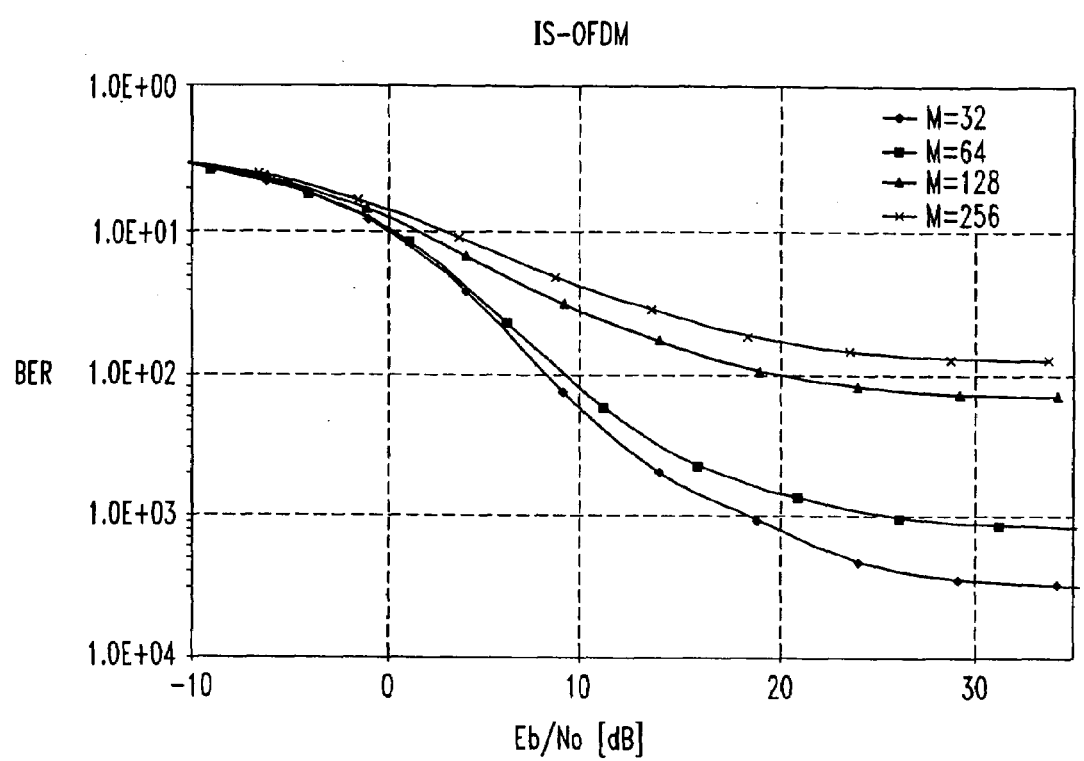
FIG. 8 shows the uncoded average bit error rate probability versus $E_b/N_0$ [dB] of a basic IS-OFDM in the UWB channel.

FIG. 8 shows the uncoded average bit error rate probability versus $E_b/N_0$ [dB] of a basic IS-OFDM in the UWB channel. As is observed, the BER performance degrades for increasing values of M. That is, among the values of $\tilde{M}$ shown, $\tilde{M}$=32 has the best and $\tilde{M}$=256 has the worst BER performance. The reason is the loss of orthogonality due to frequency selective fading. Given that the width of a basic IS-OFDM block for $\tilde{M}$=32 is B≈10 MHz, the channel frequency response appears to be flat (non-frequency selective) since $(\Delta f)_c > B$. However, as the value of M increases, (i.e., for $\tilde{M}$=64, 128 and 256 corresponding to B≈20, 40, 80 MHz) the frequency selectivity of the channel increases, which introduces a noise caused by the loss of orthogonality. This is in addition to the ICI/ISI interference considered above, which is taken to be $5 \times 10^{-5}$. On the other; hand, if $\tilde{M} \ll 32$, the BER performance may degrade again since the band B may not be sufficiently wide for the system to be resistant to narrow-band interference and deep narrow-band frequency fades.

Figure 9:
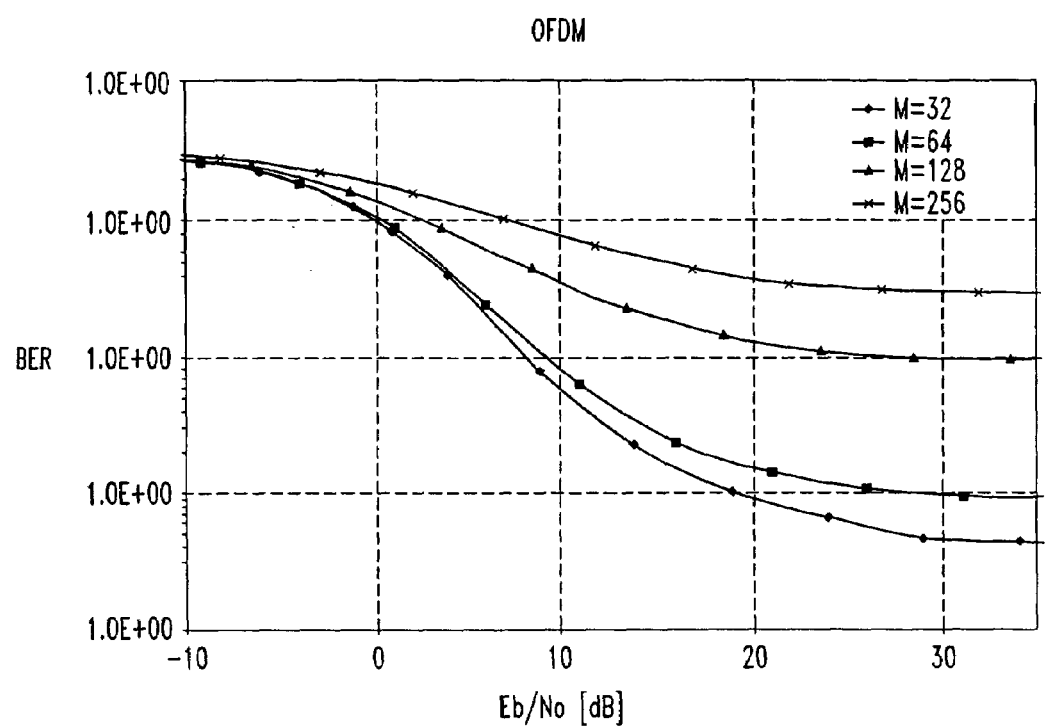
FIG. 9 shows the uncoded BER of an equivalent ordinary OFDM system with M=32, 64, 128 and 256 frequency bins.

Compare the above IS-OFDM with an equivalent ordinary OFDM system under the same channel conditions. FIG. 9 shows the uncoded BER of an equivalent ordinary OFDM system with $\tilde{M}$=32, 64, 128 and 256 frequency bins. If FIGS. 8 and 9 are compared, the BER performance of the IS-OFDM and ordinary OFDM systems for $\tilde{M}$=32 are about the same. For $\tilde{M} \geq 64$ however, the OFDM performance deteriorates more than the IS-OFDM. This advantage of the IS-OFDM over the ordinary OFDM becomes greater as the value of M increases. This means that the OFDM BER performance is completely unacceptable for $\tilde{M}$>256 (or B>80 MHz). Therefore, the ordinary OFDM cannot offer acceptable performance in UWB channel applications, (i.e., when $\tilde{M}=\tilde{N}$=4096). The IS-OFDM then is the alternative UWB frequency domain system which can offer the best performance for the given channel type when $\tilde{M}$=32 (or B>10 MHz) and L=128 (L=$\tilde{N}/\tilde{M}$=4096/32).

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications within the spirit and scope of the underlying invention disclosed and claimed herein.

We claim:

1. An interference suppressing orthogonal frequency division modulation (IS-OFDM) system for ultra-wideband (UWB) wireless communications that suppresses narrowband interference, comprising an in-premises base station (IBS), said IBS comprising an IS-OFDM transceiver for communicating with a plurality of in-premises terminals (ITs) without creating interference outside an in-premises perimeter, wherein a transmitted signal comprises a plurality of subcarriers, and further wherein each subcarrier contains more than one and potentially all symbols transmitted in a given frame, said IS-OFDM transceiver comprising an IS-OFDM transmitter and an IS-OFDM receiver, said IS-OFDM transmitter further comprising:

a serial-to-parallel (S/P) converter, said S/P converter accepting an input data stream and operating on said input data stream to produce a plurality of parallel data streams;

a first plurality of S/P converters, each of said first plurality of S/P converters accepting one of said parallel data streams and producing a plurality of parallel data sub-streams;

a plurality of spreaders, each spreader of said plurality of spreaders coupled to one of said first plurality of S/P converters and operating on one of said plurality of parallel data sub-streams, spreading said one of said plurality of parallel data sub-streams by an orthogonal binary code sequence and resulting in a plurality of parallel spread data sub-streams separated from each other by orthogonal codes;

a second plurality of S/P converters, each of said second plurality of S/P converters accepting one of said plurality of parallel spread data sub-streams and producing a plurality of parallel data signals;

an encoder for encoding said plurality of parallel data signals to produce a plurality of encoded data signals;

an inverse discrete Fourier transform (IDFT) coupled to said encoder, said IDFT accepting said plurality of encoded data signals and producing a plurality of IDFT outputs;

a parallel-to-serial (P/S) converter coupled to said IDFT, said P/S converter accepting said plurality of IDFT outputs and producing an intermediate IS-OFDM data signal, wherein said intermediate IS-OFDM data signal comprises a plurality of frames and said P/S converter further adds a cyclic prefix to each frame of said intermediate IS-OFDM data signal to produce an IS-OFDM data signal; and a digital-to-analog (D/A) converter, said D/A converter accepting said IS-OFDM data signal and producing an IS-OFDM transmit signal.

2. An interference suppressing orthogonal frequency division modulation (IS-OFDM) system for ultra-wideband (UWB) wireless communications that suppresses narrow-band interference, comprising an in-premises base station (IBS), said IBS comprising an IS-OFDM transceiver for communicating with a plurality of in-premises terminals (ITs) without creating interference outside an in-premises perimeter, wherein a transmitted signal comprises a plurality of subcarriers, and further wherein each subcarrier contains more than one and potentially all symbols transmitted in a given frame, said IS-OFDM transceiver comprising an IS-OFDM transmitter and an IS-OFDM receiver, said IS-OFDM receiver further comprising:

an analog-to-digital (A/D) converter, said A/D converter accepting a received analog signal and operating on said received analog signal to produce a digital received signal;

a serial-to-parallel (S/P) converter coupled to said A/D converter, said S/P converter accepting said digital received signal comprising a plurality of frames and operating on said digital received signal to produce a plurality of parallel received data points, said S/P converter further operating on said digital received signal to remove a cyclic prefix from each frame;

a discrete Fourier transform (DFT) coupled to said S/P converter, said DFT accepting said plurality of parallel received data points and operating on said plurality of parallel received data points to produce complex data signal points;

a decoder-demapper coupled to said DFT, said decoder-demapper accepting said complex data signal points and operating on said complex data signal points to produce a plurality of parallel data points;

a first plurality of parallel-to-serial (P/S) converters coupled to said decoder-demapper, said first plurality of P/S converters accepting said plurality of parallel data points and operating on said plurality of parallel data points to produce a serial data stream;

a plurality of despreaders coupled to one of said plurality of P/S converters, said plurality of despreaders accepting said serial data stream and operating on said serial data stream in parallel with a plurality of code sequences to produce despread data signals;

a plurality of accumulators, each accumulator coupled to one of said plurality of despreaders, said plurality of accumulators accepting said despread data signals and operating on said despread data signals to produce accumulated data streams;

a second plurality of P/S converters coupled to said plurality of accumulators, each of said plurality of P/S converters accepting said accumulated data streams and operating on said accumulated data streams to produce an intermediate recovered data stream; and a P/S converter coupled to said second plurality of P/S converters, said P/S converter accepting said intermediate recovered data streams and operating on said intermediate recovered data streams to produce a recovered data stream.

3. A method for operating an interference suppressing orthogonal frequency division modulation (IS-OFDM) transmitter for ultra-wideband (UWB) wireless communications that suppresses narrow-band interference comprising the steps of:

serial-to-parallel converting an input data stream to produce a plurality of parallel data streams;

further serial-to-parallel converting said plurality of parallel data streams to produce a plurality of parallel data sub-streams;

spreading said plurality of parallel data sub-streams by an orthogonal binary code sequence resulting in a plurality of parallel spread data sub-streams separated from each other by orthogonal codes;

further serial-to-parallel converting said plurality of parallel spread data sub-streams to produce a plurality of parallel data signals;

encoding said plurality of parallel data signals to produce a plurality of encoded data signals;

operating on said plurality of encoded data signals to produce a plurality of IDFT outputs;

parallel-to-serial converting said plurality of IDFT outputs to produce an intermediate IS-OFDM data signal, wherein said intermediate IS-OFDM data signal comprises a plurality of frames;

adding a cyclic prefix to each frame of said intermediate IS-OFDM data signal to produce an IS-OFDM data signal; and digital-to-analog converting said IS-OFDM data signal to produce an IS-OFDM transmit signal.

4. A method for operating an interference suppressing orthogonal frequency division modulation (IS-OFDM) receiver for ultra-wideband (UWB) wireless communications that suppresses narrow-band interference comprising the steps of:

analog-to-digital converting a received analog signal;

operating on said received analog signal to produce a digital received signal;

serial-to-parallel converting said digital received signal, comprising a plurality of frames, to produce a plurality of parallel received data points;

further operating on said digital received signal to remove a cyclic prefix from each frame;

further operating on said plurality of parallel received data points to produce complex data signal points;

decoding and demapping said complex data signal points to produce a plurality of parallel data points;

parallel-to-serial converting said plurality of parallel data points to produce a serial data stream;

despreading said serial data stream to produce despread data signals;

accumulating said despread data signals to produce accumulated data streams;

parallel-to-serial converting said accumulated data streams to produce an intermediate recovered data stream; and further parallel-to-serial converting said intermediate recovered data streams to produce a recovered data stream.

* * * * *